Oct. 28, 1930.  F. LJUNGSTRÖM  1,780,087
REVERSING DEVICE FOR TOOTHED GEARINGS, PARTICULARLY IN SHIPS,
LOCOMOTIVES, AND THE LIKE, DRIVEN BY STEAM TURBINES
Filed March 25, 1924   2 Sheets-Sheet 1

Inventor
F. Ljungström
By Marks & Clerk
Attys.

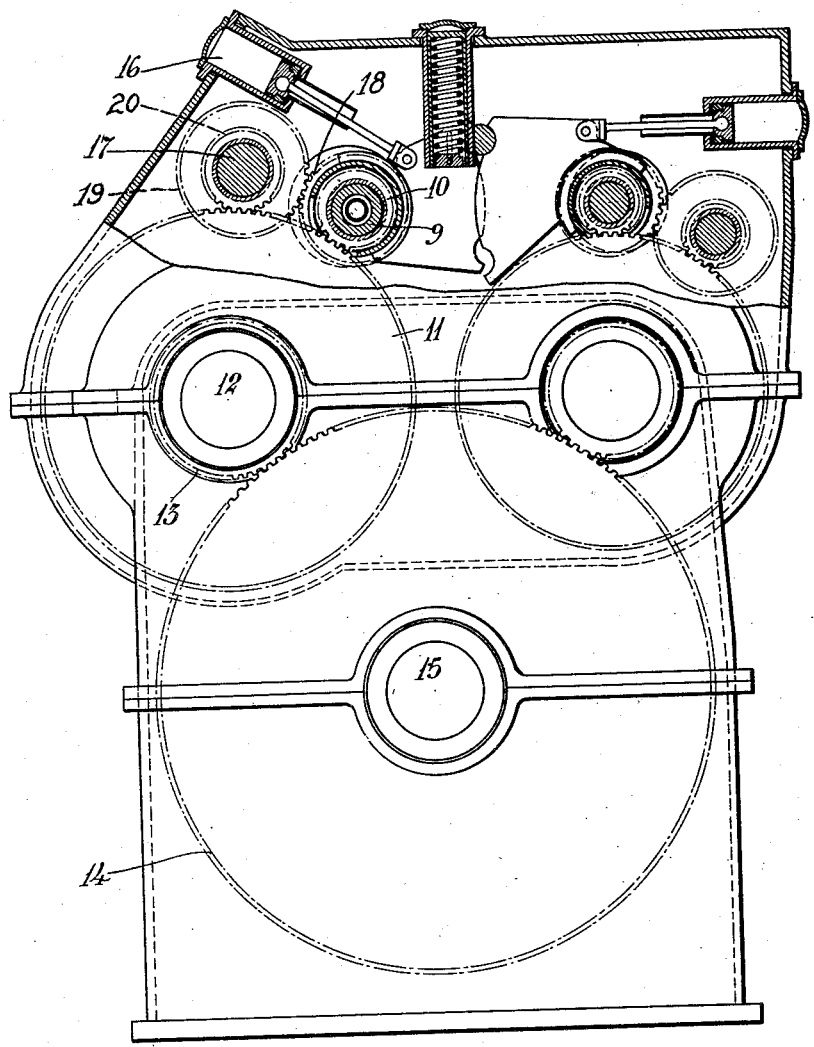

Patented Oct. 28, 1930

1,780,087

UNITED STATES PATENT OFFICE

FREDRIK LJUNGSTRÖM, OF LIDINGO-BREVIK, SWEDEN, ASSIGNOR TO AKTIEBOLAGET LJUNGSTRÖMS ÅNGTURBIN, OF LIDINGO-BREVIK, SWEDEN, A CORPORATION

REVERSING DEVICE FOR TOOTHED GEARINGS, PARTICULARLY IN SHIPS, LOCOMOTIVES, AND THE LIKE, DRIVEN BY STEAM TURBINES

Application filed March 25, 1924, Serial No. 701,856, and in Sweden March 31, 1923.

In running ships, locomotives and the like, means have previously been proposed comprising one or more steam turbines, which transmit the power to the driving shaft by means of a single, double or manifold speed-reducing toothed gearing. In such aggregates difficulties have always arisen in order to obtain reverse running, for instance of a propeller shaft in case of the toothed gearing being adapted for running ships, for which purpose auxiliary turbines particularly adapted for reverse running have hitherto been used. Such turbine aggregates have always required a large space and, besides, difficulties arise in order to arrange the said auxiliary turbine with relation to the main turbines, as it is, obviously, unsuitable to bring the main turbines to rotate idle without performing any work by being driven in said manner from the back turbine. It has even occurred that the said turbine partaking in the rotation, either if it has been brought to rotate in the backward or forward direction, has obtained, due to the friction against the steam or the air remaining in the turbine, such a high temperature that its blade system has been demolished.

In order to facilitate reversing, it has also been proposed to use friction couplings of different construction, by which it is rendered possible either to uncouple the turbines, which do not perform any work, when coupling in the turbine which shall on this occasion drive, or to uncouple or couple in gear wheels of the speed-reducing toothed gearing. Such reversing devices may, for instance, be constructed as an epicycloidal toothed gearing or the like.

Figure 1:
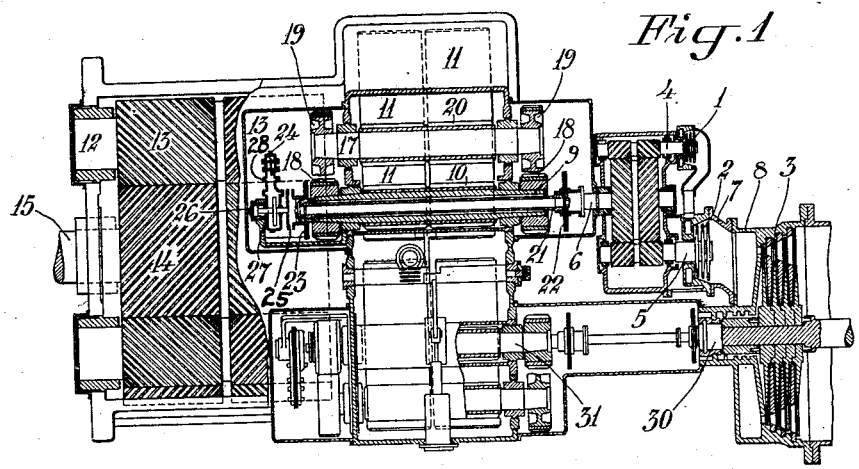

All the reversing devices of the above mentioned kind are always affected with drawbacks, which have rendered the aggregate less reliable. Thus, the efforts are to relinquish the said principles of performing backward running and to construct reversing devices without additional turbines or the above-mentioned less reliable friction couplings. The present invention relates to such toothed gearings and comprises a reversing device for the toothed gearing of a reliable construction.
The invention is shown in the annexed drawings, illustrating one form of embodiment thereof. Fig. 1 shows a horizontal section of a turbine aggregate for ships driven by means of toothed gearings. Fig. 2 is a vertical section thereof and Fig. 3 an assembling view of the whole turbine aggregate.

According to the form of embodiment shown, the turbine aggregate comprises three turbines 1, 2 and 3, which are coupled in series in such manner that the high pressure steam passes first the blade system 1, which, thus, serves as high pressure turbine, and then the blade systems 2 and 3, which, thus, serve as an intermediate pressure turbine and a low pressure turbine, respectively. The turbines 1 and 2 are mounted overhanging on shafts 4 and 5, respectively, in a manner previously proposed, said shafts carrying pinions, by which the movement from the said two turbines is transmitted to the shaft 6. For simplicity's sake this shaft 6 will hereinafter be referred to as the driving shaft. The turbines 1 and 2 together with the appertaining shafts and toothed gearings are as a system, the high pressure system, suspended on the discharge conduit 7 in known manner, said conduit being in turn rigidly secured to the supply part 8 of the low pressure turbine 3.
9 designates a shaft, which is adjustably connected to the driving shaft 6 of the high pressure system. This shaft 9 will hereinafter be referred to as the reversing shaft. On running forward the pinions 10 secured to said reversing shaft (Fig. 2) engage gear wheels 11 mounted on the shaft 12, which will hereinafter be referred to as the driven shaft. Mounted on the said shaft 12 is also a smaller pinion 13, which co-operates with a gear wheel 14 rigidly secured to the propeller shaft 15 of the aggregate.

In order to obtain reverse running the pinions 10 are brought out of engagement with the gear wheels 11, which is rendered possible by the shaft 9 being mounted in an eccentric capable of being rotated by means of oil in the oil cylinder 16. After the pinion 10 has been brought out of engagement with the gear wheel 11, gear wheels secured to an intermediate shaft 17 are brought into engagement with pinions on the shaft 9 and with the gear wheels 11, respectively. The said operation is rendered possible by the shafts 9 and 17, which are both eccentrically mounted and may be displaced by means of oil in oil cylinders, having additional pinions 18, 19 and 20, respectively, shown in Fig. 1. When the radially displaceable shafts 9 and 17 have been so displaced with relation to each other and to the shaft 12 that the pinions 10 have been brought out of engagement with the gear wheels 11, the gear wheels 18 and 19 are moved into engagement with each other, and at the same time the gear wheel 20 is brought into engagement with the gear wheels 11, thus performing reverse running.

The additional pinions 18 and 19 may be dispensed with, if skew-cut gear wheels be not used. However, if skew-cut gear wheels be used, which is suitable or rather necessary for greater amounts of power, the pinions 18 and 19 may also be substituted by so-called cross-cut gear wheels at 20. Besides the advantage that the provision of the additional pinions 18 and 19 is more durable, the use of said pinions entails the further advantage that the speed of the turbines can be reduced to a greater extent when running backwards that when running forwards, which is always desirable.

The form of embodiment of the reversing device described may be modified in that respect that the intermediate shaft 17 is mounted stationary in such manner that the pinion 20 provided on said shaft is constantly in mesh with the gear wheel 11 provided on the driven shaft 12, in which case the shaft 17 rotates constantly with the toothed gearing, the reverse running being obtained by this that the axial movement of the shaft 9 renders possible the disengagement of the pinions 10 and the gear wheel 11 and the engagement of the pinions 18 and 19. By such means the reversing device will be simpler to some extent having but one axially movable shaft; however, the drawback arises that a shaft with appertaining pinions will always rotate with the toothed gearing, even if it does not transmit any power, which entails unnecessary wear, decreases the efficiency and causes unnecessary noise.

According to the invention the radially movable reversing shaft 9 is disposed at the elongation of the driving shaft 6 and connected to said latter shaft in such manner that parallel displacements of the shafts relatively to each other are allowed. This is rendered possible in the form of embodiment shown by a shaft 21 running through the hollow shaft 9 being connected at its right hand part with the driving shaft 6 by means of a diaphragm coupling 22 and at its left hand part with the hollow reversing shaft 9 by means of a diaphragm coupling 23. A parallel displacement of the hollow shaft 9 causes, due to the relatively great length of the shaft 21, but small angle deviations of the diaphragms, and by such means the parallel displacement is rendered possible. Obviously, the movements of the reversing shaft 9 and the intermediate shaft 17 have to be dependent on each other in such manner that an inaccurate mesh cannot take place, and, besides, the several wheels of the toothed gearing have to be still-standing during the reversing from backward running to forward running or vice versa.

According to the invention all controlling movements are performed by means of oil in such manner that oil under pressure is introduced into cylinders, in which pistons actuated by the oil perform the desired movements. The oil conduits leading to the different consuming places may be drawn to a common controlling place arranged in such manner that the reversing can be performed in a certain order only. In order to facilitate the engagement of two gear wheels moved in the direction towards one another an auxiliary motor is provided, which rotates at the reversing moment a shaft carrying a pinion, the teeth of said pinion being, thus, rotated with relation to the teeth of the wheels, with which it is to be brought into engagement, so that a tooth is always caused to enter into a tooth space. In Fig. 1 such an auxiliary motor 24 is shown, comprising in the form of embodiment shown a turbine driven by means of oil and having an appertaining toothed gearing 28 capable of being connected to the pinion shaft by means of a toothed coupling 25. The said motor is put in function at the reversing moment in such manner that oil is first pressed into the cylinder 26 and displaces the shaft 27, so that the toothed coupling 25 is thrown into action, and then the oil turbine 24 is put in motion, and the said order is secured by this that the oil driving the oil turbine must first pass through the cylinder 26 and cannot pass out from the same before the piston provided in the cylinder has been pressed inwards to such an extent that the coupling 25 has been coupled in. The auxiliary motor 24 is disposed in such manner that it partakes in the radial movements of the shaft 9, and on account thereof it is capable of being put in action at all positions of said shaft 9. Thus, on reversing, the auxiliary motor 24 turns the shaft 9 first after its pinion 10 has been brought out of engagement with the gear wheels 11. Thus, while the engagement takes place between the pinions 10 and the gear wheel 11 of the shaft 17, the shaft 9 rotates with a small speed. After the engagement has been completed, also the shaft 17 is put in rotation, if also said shaft is mounted eccentrically, the engagement of the wheels 20 and 11 taking, thereby, place. After the reversing has been accomplished, the reversing motor 24 is thrown out of action and does not act before at the next reversing.

The shaft 30 of the low pressure turbine is connected to the radially movable shaft 31 in the same manner as described above with relation to the high pressure system, the diaphragms and their connecting shaft being, however, disposed at the side of the shaft 31, which ought, consequently, not to be hollow.

Figure 3:
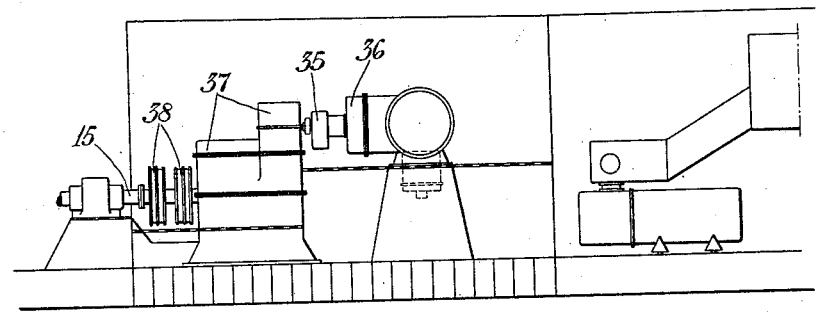

In Fig. 3, 35 designates the high pressure system of the aggregate, 36 its low pressure system and 37 the casing surrounding the toothed gearing, from which the movement is transmitted to the propeller through the propeller shaft 15. On said shaft two brake devices are shown at 38, by means of which the propeller shaft is braked to still-stand during the reversing.

Means may also be provided, by which the engineer may follow the run of the reversing and observe, when the reversing is completed. Such means may be combined with an apparatus, by which the reversing is performed automatically. As previously has been proposed, the said apparatus may be constructed as a piston reciprocating in an oil cylinder, which piston is either pressed down or turned or both in a predetermined order, during which movement oil is delivered to the different members, whereby means may be provided, which prevent the displacement of the piston for rendering possible a continued control, before a previous, controlling movement has been completed. The control may also be assumed to be performed in such manner that oil under pressure is supplied to all the control places in the succession in which they are to be controlled and cannot pass such a place, before the previous control has been completed. Obviously, controlling devices according to both of the said principles may be arranged in combination with each other, and the kind of apparatus to be used is, obviously, depending on the construction of the different controlling members.

Thus, according to the invention it is possible to perform reversing in toothed gearings also at so great amounts of power, where friction couplings or similar constructions cannot be used. Besides that a reversing device according to the invention is smaller, it is also possible to make the whole turbine aggregate smaller and lighter by this that the aggregate may be constructed for so great amounts of power, for which otherwise two or more aggregates have been required.

Obviously, several modifications according to the invention may be assumed, without departing from its scope, and the invention is, obviously, independent of the particular construction of toothed gearing and of the kind of driving means to be used.

What I claim as new and desire to secure by Letters Patent of the United States of America is:—

1. A toothed gearing particularly adapted for ships and the like, comprising a driving shaft, a driven shaft, a reversing shaft disposed at the elongation of said driving shaft, means to journal said reversing shaft so as to enable it to be displaced radially and parallel to itself, an intermediate shaft, a gear on said driven shaft, a gear on said intermediate shaft and meshing with said gear of the driven shaft, a gear on said reversing shaft adapted to be brought into and out of engagement with the gear of the driven shaft, a second gear on said intermediate shaft, a second gear on said reversing shaft adapted to be brought into and out of engagement with said second gear of said intermediate shaft, a coupling connecting said reversing shaft with said driving shaft, and admitting the said radial displacement of the reversing shaft while maintaining the connection with the driving shaft.

2. A toothed gearing particularly adapted for ships, locomotives and the like, comprising a driving shaft, a reversing shaft disposed at the elongation of said driving shaft, an intermediary shaft, a coupling connecting said reversing shaft with said driving shaft, a driven shaft, a gear on the driven shaft, two gears on the reversing shaft, two gears on the intermediary shaft, one of said gears on the reversing shaft adapted to be brought into and out of engagement with the gear on the driven shaft and the second gear adapted to be brought into and out of engagement with one gear on the intermediary shaft, the second gear on said intermediary shaft adapted to be brought into and out of engagement with the gear on the driven shaft.

3. A toothed gearing particularly adapted for ships, locomotives and the like, comprising a driving shaft, a reversing shaft disposed at the elongation of said driving shaft, an intermediary shaft, a driven shaft, a gear on the driven shaft, two gears on the reversing shaft, two gears on the intermediary shaft, one of said gears on the reversing shaft adapted to be brought into and out of engagement with the gear on the driven shaft and the second gear adapted to be brought into and out of engagement with one gear on the intermediary shaft, the second gear on said intermediary shaft adapted to be brought into and out of engagement with the gear on the driven shaft and means to journal said reversing shaft so as to enable it to be displaced radially and parallel to itself.

4. A toothed gearing particularly adapted for ships and the like, comprising a driving shaft, a driven shaft, a reversing shaft disposed at the elongation of said driving shaft, means to journal said reversing shaft so as to enable it to be displaced radially and parallel to itself, an intermediate shaft, a gear on said driven shaft, a gear on said intermediate shaft and adapted to be brought into and out of engagement with said gear of the driven shaft, a gear on said reversing shaft adapted to be brought into and out of engagement with the gear of the driven shaft, a second gear on said intermediate shaft, a second gear on said reversing shaft adapted to be brought into and out of engagement with said second gear of said intermediate shaft, a coupling connecting said reversing shaft with said driving shaft, and admitting the said radial displacement of the reversing shaft while maintainng the connection with the driving shaft.

5. A toothed gearing particularly adapted for ships, locomotives and the like, comprising a radially non-displaceable driving shaft, a reversing shaft disposed at the elongation of said driving shaft, a coupling connecting said reversing shaft with said driving shaft, an intermediary shaft, a driven shaft, a gear on the driven shaft, two gears on the reversing shaft, two gears on the intermediary shaft, one of said gears on the reversing shaft adapted to be brought into and out of engagement with the gear on the driven shaft and the second gear adapted to be brought into and out of engagement with one gear on the intermediary shaft, the second gear on said intermediary shaft adapted to be brought into and out of engagement with the gear on the driven shaft.

In testimony whereof I affix my signature.

FREDRIK LJUNGSTRÖM.